US011073166B2

(12) United States Patent
Gorali

(10) Patent No.: US 11,073,166 B2
(45) Date of Patent: Jul. 27, 2021

(54) MOUNTING APPARATUS FOR A CEILING FAN

(71) Applicant: Yuval Shimon Gorali, Tel Aviv (IL)

(72) Inventor: Yuval Shimon Gorali, Tel Aviv (IL)

(*) Notice: Subject to any disclaimer, the term of this patent is extended or adjusted under 35 U.S.C. 154(b) by 0 days.

(21) Appl. No.: 16/981,616

(22) PCT Filed: Mar. 4, 2019

(86) PCT No.: PCT/IL2019/050236
§ 371 (c)(1),
(2) Date: Sep. 16, 2020

(87) PCT Pub. No.: WO2019/180692
PCT Pub. Date: Sep. 26, 2019

(65) Prior Publication Data
US 2021/0048041 A1    Feb. 18, 2021

(30) Foreign Application Priority Data
Mar. 18, 2018   (IL) .......................................... 258194

(51) Int. Cl.
*F04D 29/64* (2006.01)
*F16M 13/02* (2006.01)

(52) U.S. Cl.
CPC ......... *F04D 29/646* (2013.01); *F16M 13/027* (2013.01)

(58) Field of Classification Search
CPC ... F04D 25/088; F04D 29/646; F16M 13/027; F21V 21/03
USPC ........................................ 248/343, 345, 344
See application file for complete search history.

(56) References Cited

U.S. PATENT DOCUMENTS

| 5,222,864 | A | 6/1993 | Pearce | |
|---|---|---|---|---|
| 6,171,061 | B1 | 1/2001 | Hsu | |
| 6,171,062 | B1 * | 1/2001 | Bucher | F04D 25/088 248/222.51 |
| 6,558,124 | B2 * | 5/2003 | Bucher | F04D 29/601 416/244 R |
| 7,300,248 | B2 * | 11/2007 | Wang | F04D 25/088 248/343 |

(Continued)

OTHER PUBLICATIONS

International Search Report and Written Opinion from International Application No. PCT/IL2019/050236 dated Jul. 12, 2019.

*Primary Examiner* — Bradley Duckworth
(74) *Attorney, Agent, or Firm* — Dorsey & Whitney LLP

(57) ABSTRACT

The disclosed subject matter concerns with an apparatus for mounting a ceiling fan to a support surface such as a ceiling. The apparatus includes a mounting bracket configured to support the ceiling fan; at least one bracket engaging surface; a canopy cover configured to be detachably mounted to the mounting bracket such that the ceiling fan is disposed below the canopy cover; and at least one cover engaging surface configured to move along the bracket engaging surface in a mounting direction. The apparatus further includes an arresting mechanism, operable as a result of the canopy cover having been moved relative to the mounting bracket in the mounting direction to a required extent, configured to releasably restrict movement of the cover engaging surface relative to the bracket engaging surface in a direction opposite to the mounting direction.

20 Claims, 9 Drawing Sheets

(56) References Cited

U.S. PATENT DOCUMENTS

| | | | | |
|---|---|---|---|---|
| 8,393,862 | B2* | 3/2013 | Chen | F04D 25/088 |
| | | | | 415/213.1 |
| 9,097,266 | B2* | 8/2015 | Lin | F04D 29/329 |
| 2002/0111063 | A1 | 8/2002 | Kerr | |
| 2003/0189151 | A1* | 10/2003 | Hsing | F04D 25/088 |
| | | | | 248/345 |
| 2004/0115062 | A1 | 6/2004 | Pearce | |
| 2005/0077446 | A1 | 4/2005 | Bacon et al. | |
| 2010/0226784 | A1 | 9/2010 | Yao | |
| 2010/0329885 | A1 | 12/2010 | Criner et al. | |
| 2011/0031368 | A1* | 2/2011 | Wang | F24F 7/007 |
| | | | | 248/343 |
| 2015/0090858 | A1 | 4/2015 | Broughman et al. | |

* cited by examiner

MOUNTING APPARATUS FOR A CEILING FAN

TECHNOLOGICAL FIELD

The presently disclosed subject matter relates to mounting ceiling fans to a support surface such as a ceiling.

BACKGROUND

Ceiling fans can be configured to be hung to a support surface such as a ceiling by means of a downrod, to gain some offset distance between their blades and the support surface, and thereby increase access of air to the blades and facilitate larger airflow to the room.

Alternatively, ceiling fans can be mounted flush with the ceiling, i.e. flush mounted ceiling fans, and these fans are normally used in cases, where there is no sufficient space in the room for a downrod.

Both types of ceiling fans normally utilize a mounting apparatus to be hung properly to different ceilings, the apparatus including a mounting bracket and a canopy cover attached thereto by fastening means, such as a plurality of screws.

GENERAL DESCRIPTION

There is provided according to the presently disclosed subject matter an apparatus for mounting a ceiling fan to a support surface such as a ceiling, the apparatus having a central axis oriented perpendicularly to the support surface when the apparatus is mounted thereto, the apparatus comprising:

a mounting bracket configured to support said ceiling fan when hanging therefrom and having a first bracket surface configured to contact the support surface, a second bracket surface opposed to said first bracket surface and spaced therefrom along the central axis, and a side wall extending between the first and second bracket surfaces;

at least one bracket engaging surface constituting a part of the side wall of the bracket and oriented transversely to the central axis of the apparatus;

a canopy cover configured to be detachably mounted to the mounting bracket, the canopy cover having a cover circumferential wall defining a cavity having an upper portion associated with a canopy upper open end, the canopy cover being configured to receive at the canopy upper open end the mounting bracket and enclose it within the cavity upper portion so that, when the canopy cover is mounted to the mounting bracket and the ceiling fan is hung therefrom, the ceiling fan is disposed below the canopy cover;

at least one cover engaging surface protruding from the cover circumferential wall into the cavity and configured to move along the bracket engaging surface in a mounting direction defined by an imaginary line at least partially lying in a plane transverse to the central axis, when during mounting, the canopy cover is moved relative to the mounting bracket in said mounting direction; and an arresting mechanism operable as a result of the canopy cover having been moved relative to the mounting bracket in said mounting direction to a required extent and configured to releasably restrict movement of the cover engaging surface relative to the bracket engaging surface in a direction opposite to the mounting direction.

With the above structure, the structure of the mounting mechanism can allow mounting the canopy cover to the mounting bracket in a single continuous operation that can be performed by a user without any external tools and means such as e.g. screws and using only one hand.

The arresting mechanism can comprise at least one canopy cover arresting element constituting a part of the canopy cover, and at least one corresponding mounting bracket arresting element constituting a part of the mounting bracket, the arresting elements of the canopy cover and the mounting bracket being configured to engage each other so to releasably restrict movement of the cover engaging surface relative to the bracket engaging surface in a direction opposite to the mounting direction, the engagement being configured to take place a result of the canopy cover having been moved relative to the mounting bracket in said mounting direction to a required extent and configured.

The cover engaging surface can be configured to move slidingly along at least a portion of the bracket engaging surface during the mounting.

Each canopy cover arresting element and the corresponding mounting bracket arresting element form a pair of arresting elements, wherein one of the pair of arresting elements can be in the form a protrusion and the other one of these elements can be in the form of a mating depression configured to at least partially receive said protrusion therein.

Each pair of arresting elements can be constituted by any combination from the following:

A single arresting element comprised by the canopy cover and a single corresponding arresting element comprised by the mounting bracket.

A single arresting element comprised by the canopy cover and a plurality of corresponding arresting elements comprised by the mounting bracket.

A single arresting element comprised by the mounting bracket and a plurality of corresponding arresting elements comprised by the canopy cover.

A plurality of arresting elements comprised by the canopy cover and a plurality of corresponding arresting elements comprised by the mounting bracket.

The at least one cover engaging surface and said at least one bracket engaging surface can constitute a plurality of cover engaging surfaces and bracket engaging surfaces, respectively, disposed oppositely to one another, and spaced from each other along the circumferential wall of the canopy cover and the sidewall of the mounting bracket, respectively.

At least a portion of at least one of said engaging surfaces can be serrated.

The mounting direction can be curved or straight.

The mounting direction can be at least partially inclined towards the first bracket surface in the mounting direction. In particular, at least a part of the imaginary line defining the mounting direction is helical about the central axis, such that a tangent line to this helical part forms an oblique angle with said central axis.

The cavity of the canopy cover can further comprise a lower portion associated with a canopy lower open end, which is opposite to the canopy upper open end. In this case, the canopy upper open end and the canopy lower open end can be aligned along said central axis.

The canopy cover can be configured to have its lower open end spaced from said second bracket surface, when the canopy is mounted to the mounting bracket, to a distance at least 0.5 times greater than the shortest distance between said first bracket surface and the second bracket surface.

The cavity of the canopy cover can have a partition disposed between the upper portion and the lower portion of the cavity, the partition being formed with a canopy cover partition opening disposed such that said central axis passes therethrough, wherein the cover circumferential wall defining the lower portion of said cavity has such a configuration as to at least partially conceal the cover partition opening from being seen by a user from a location spaced downwardly from the ceiling such as a floor under the ceiling, when the ceiling fan is mounted to the support surface, by an observer.

Any surface of the bracket and the canopy cover, which faces towards the lower portion of said cavity and is seen through the canopy lower open end, can be colored in a dark color. In this case, a surface of the circumferential wall that faces towards an exterior of the apparatus, can be colored in a color substantially lighter than said dark color.

The apparatus can further comprise a locking arrangement configured, at least when the canopy cover is mounted to the mounting bracket, to selectively restrict the canopy cover from being detached from the mounting bracket. The locking arrangement can be a snap-locking arrangement, concealed within the apparatus when assembled and comprising an elastic member and a compressing member configured to compress the elastic member as the canopy cover is being mounted to the mounting bracket, and snap-release the compression at a pre-determined disposition between the elastic member and the compressing member so as to lock the compressing member and the elastic member together.

The canopy cover can further comprise an access path configured to provide a restricted access to the elastic member from an exterior of the apparatus, and the access path can be such that only a designated tool can be inserted therein to release the compression of the elastic member.

All the elements of the canopy cover and the mounting bracket described herein extend between the cover circumferential wall and the first bracket surface, except the access path. This allows the exterior of the cover circumferential wall to be of smooth design, i.e. free of any elements protruding outwardly therefrom or recessed therein. This facilitates maintenance of the mounting apparatus keeping its cover circumferential wall free of dust collecting elements and thus clean. In addition, the fact that all the elements involved in the engagement between the canopy cover and the mounting bracket, i.e. the cover engaging element, the bracket engaging element, and the locking arrangement, are disposed within the interior of the apparatus allows them to be of any geometry desired for their intended function, i.e. without considering any esthetical features dictated by their design. Examples of such geometries in the apparatus described herein are the sloped design of the bracket engaging surface, the partially sloped design of the cover engaging surface, the serrated designs of both the engaging surfaces, the design of the leaf spring etc.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
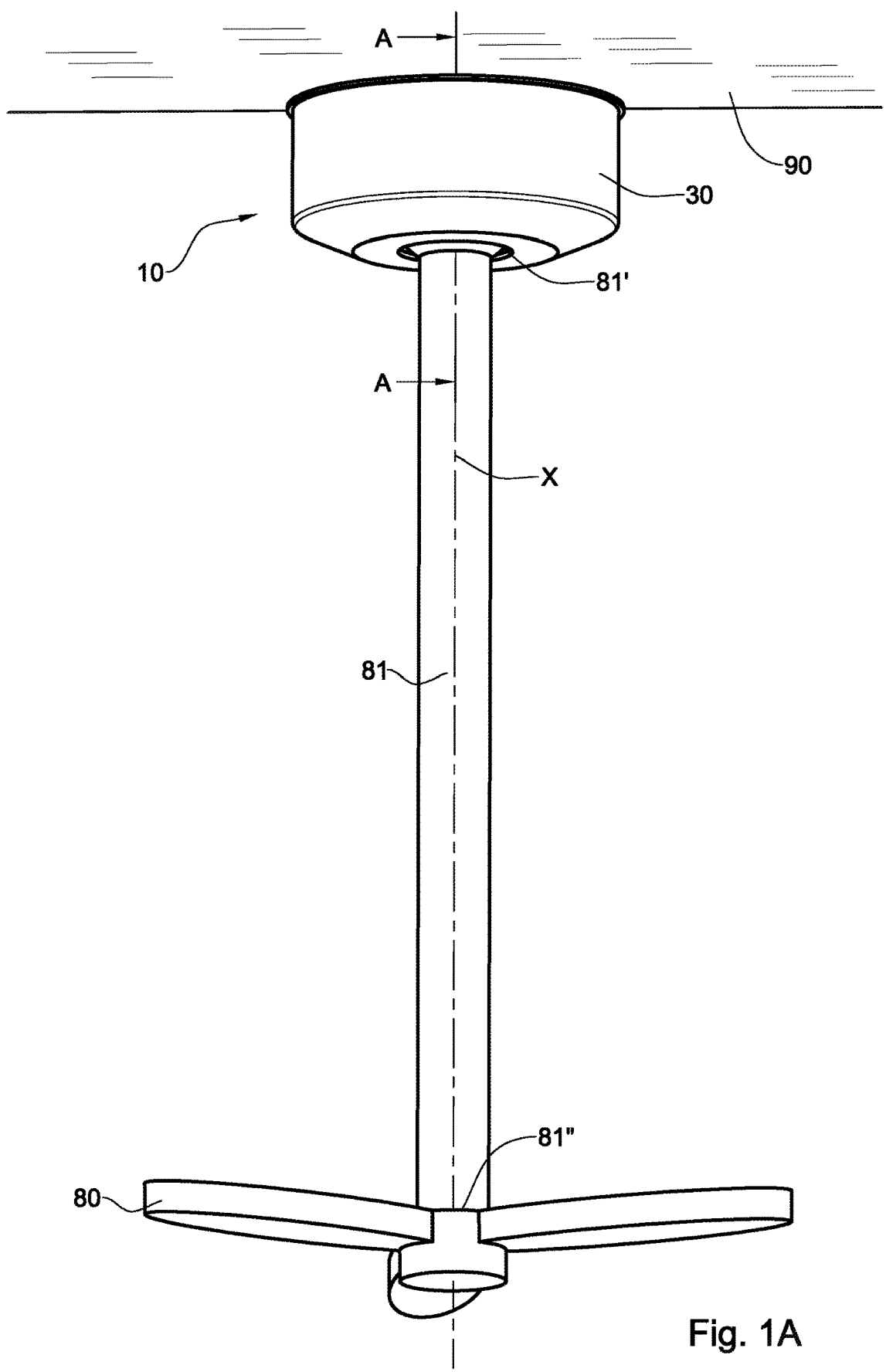
FIG. 1A is a perspective view of a ceiling fan mounted to a ceiling by means of a downrod and a mounting apparatus according to one example of the presently disclosed subject matter.

Attention is first directed to FIG. 1A illustrating a ceiling fan 80 with its downrod 81, via which it is mounted to a horizontal ceiling 90 by means of a mounting apparatus 10, according to one example the presently disclosed subject matter. The downrod 81 has an upper end 81', at which it is configured to engage the mounting apparatus 10, and a lower end 81" holding the ceiling fan 80.

The apparatus 10 has a central axis X, and is configured to be mounted to the ceiling 90 so that this axis is oriented perpendicularly to the ceiling 90.

Figure 1B:
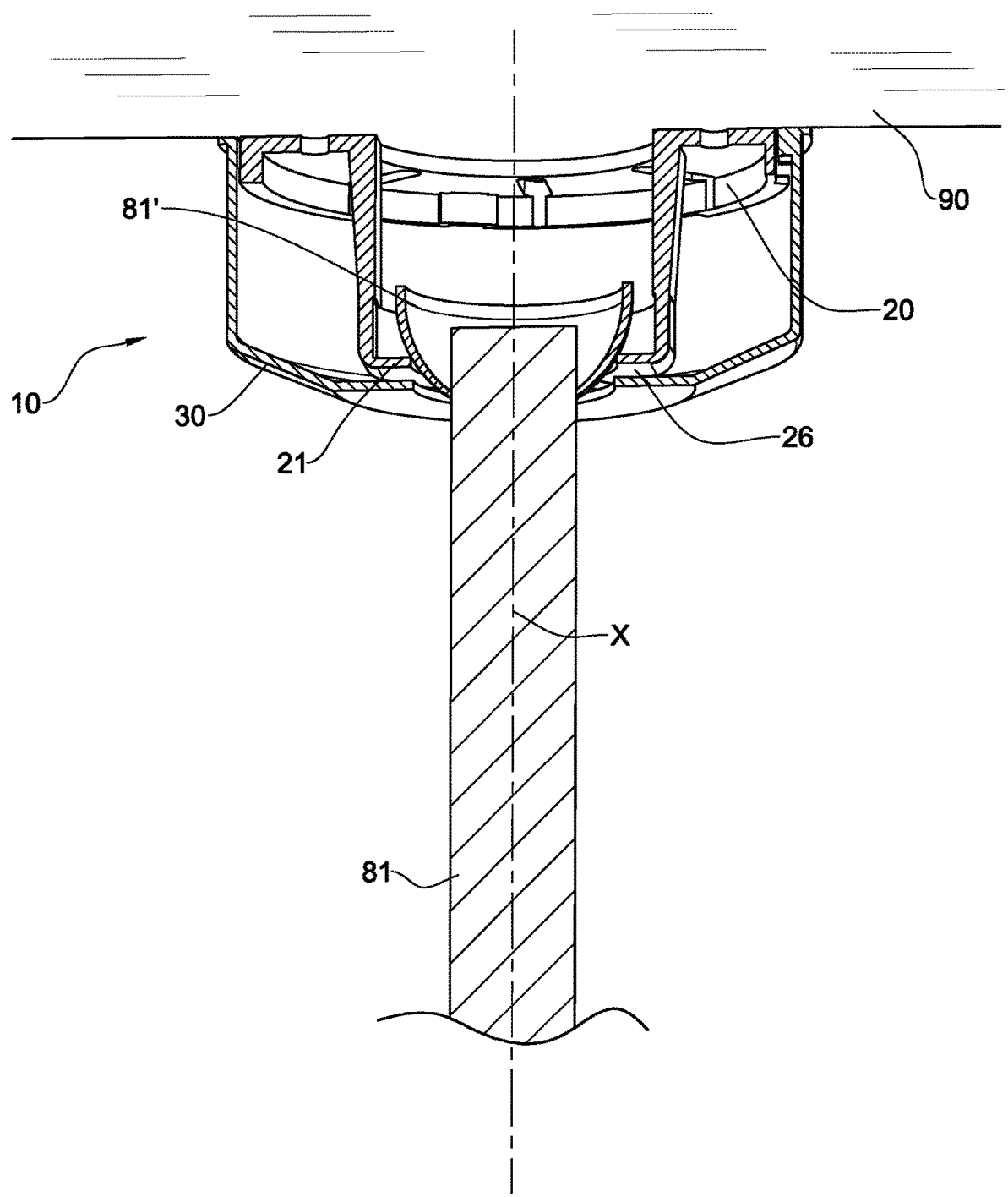
FIG. 1B is a cross-sectional view of the mounting apparatus and the downrod shown in FIG. 1A, taken along a plane A-A.

With reference to FIG. 1B, the apparatus 10 generally comprises a mounting bracket 20 having its central axis X', and a canopy cover 30 having a central axis X", which are configured to be assembled so that their axes X' and X" constitute together the central axis X. The mounting bracket and the canopy cover are shown separately in respective FIGS. 2A and 2B.

Figure 2A:
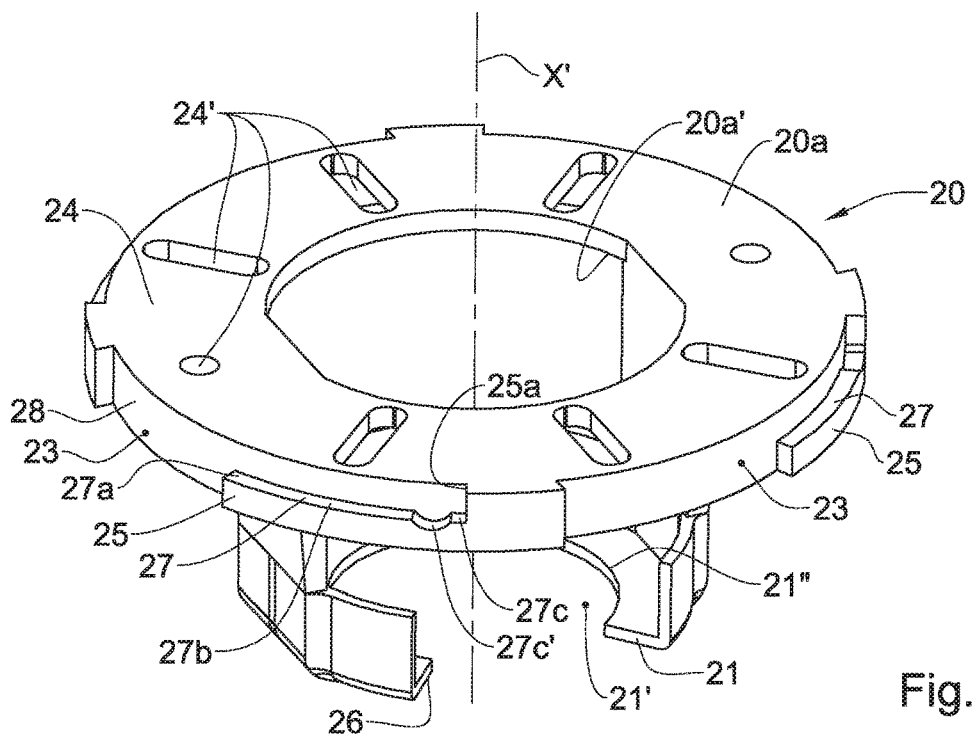
FIG. 2A is a perspective view of a mounting bracket of a mounting apparatus according to a first example of the presently disclosed subject matter.

With reference to FIG. 2A, the mounting bracket 20 has base 20a with a first bracket surface 24 constituting the uppermost surface of the base 20a of the mounting bracket 20, and a second bracket surface 26 spaced from the first bracket surface along the axis X' and constituting the lowermost surface of the base of the mounting bracket, when the mounting bracket is held in an orientation, in which it is to be mounted to the ceiling 90. The base 20a of the mounting bracket 20 further comprises a side wall 28, which extends between the first and second bracket surfaces 24 and 26.

The mounting bracket can comprise any suitable means for the fixation thereof to the ceiling 90. In the described example, these means include a plurality of fastening bores 24' configured to allow fixation of the mounting bracket 20 to the ceiling 90 by fasteners [not shown].

The mounting bracket can further comprise any means for holding the downrod 81 at its upper end 81' at an area of the mounting bracket disposed adjacent the lowermost surface 20a' of its base 20a, and optionally protruding axially from the lowermost surface 20a' of the base 20a in the direction away from its uppermost surface 24 in the present example, where the upper end 81' of the downrod 81 is in the form of a half-sphere mounting portion, the mounting bracket 20 comprises a mounting collar 21 formed with a socket 21' configured to receive this half-sphere portion therein such that it bears against edges 21" of the socket 21' allowing the remainder of the downrod 81 to extend downwardly from the mounting collar 21. The socket 21' has dimensions, which allow the downrod held thereby a certain degree of freedom due to which it can change its orientation between a vertical orientation, in which the lower end 81" of the downrod 81 is disposed on the axis X', and a slightly inclined orientation, in which the lower end 81" of the downrod 20 is spaced from the this axis in the radial direction. This freedom is required for normal operation of the ceiling fan.

Figure 2B:
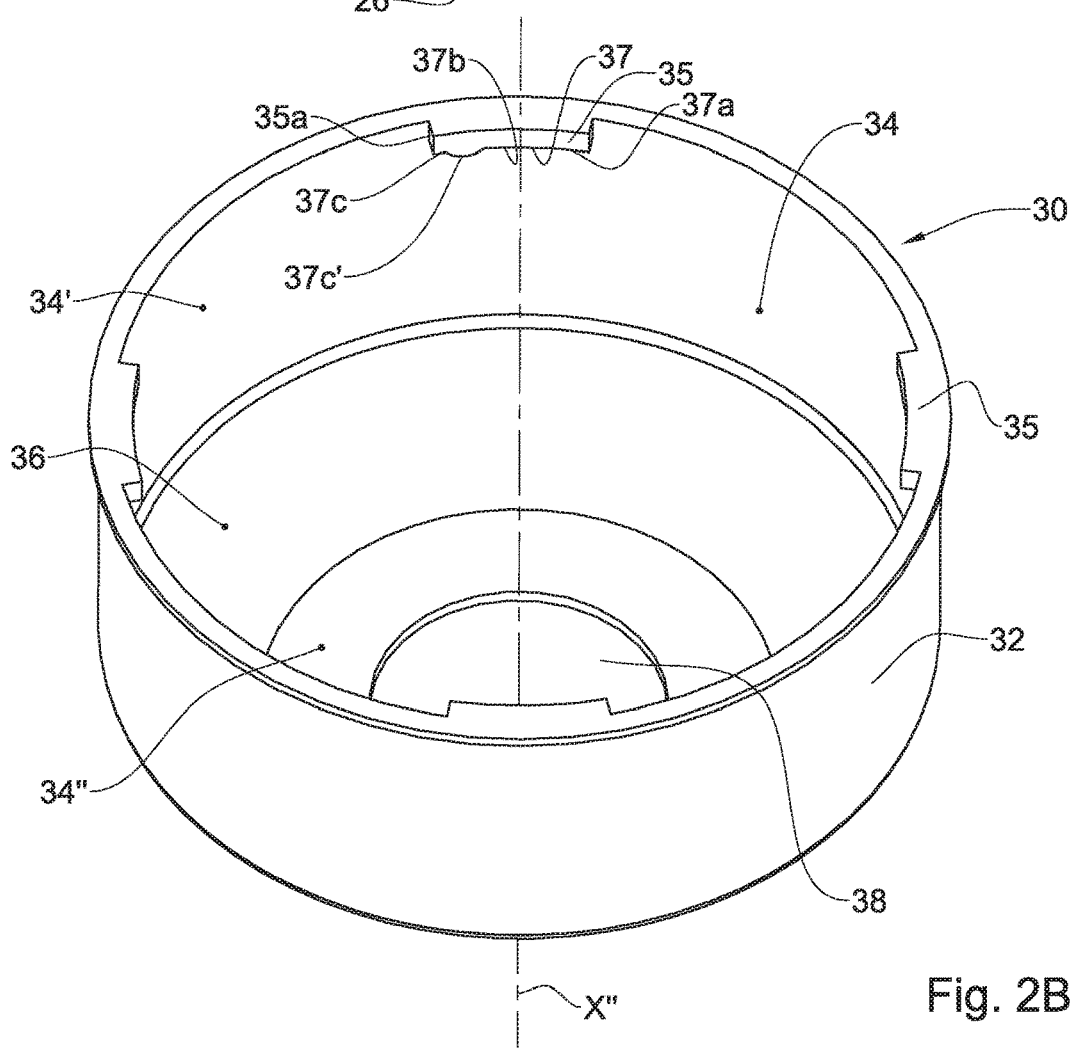
FIG. 2B is a perspective view of a canopy cover of the mounting apparatus whose mounting bracket is shown in FIG. 2A.

With reference to FIG. 2B, the canopy cover 30 comprises a cover circumferential wall 32, which defines a cavity 34 having an upper portion 34' associated with a canopy upper open end 36 and a lower portion 34" associated with a canopy lower open end 38, the two ends being spaced from each other along the axis X". The canopy upper open end 36 is configured to allow the downrod to pass therethrough so as to protrude downwardly from the lower open end 38 of the canopy cover when it is assembled with the mounting bracket. In the present example, the canopy cover has such a shape that it is essentially wider at its upper open end 36 than at its lower open end 38, i.e. the former end has a diameter essentially greater than the latter end. However, the lower open end 38 should still be sufficiently wide to allow the above freedom of movement of the downrod 81.

The mounting bracket 20 and the canopy cover 30 can comprise any mutually engaging means allowing the canopy cover 30 to be attached to the mounting bracket 20, during the assembling of the mounting apparatus 10, so as to cover at least the area of the mounting bracket, at which it holds the upper end 81' of the downrod 81, and more preferably a majority or the whole of the mounting bracket. These engaging means will hereinafter be referred to as bracket engaging elements and corresponding canopy cover engaging elements.

In general, the bracket engaging elements and the corresponding canopy engaging elements can be configured so as to provide a bayonet-type coupling of the canopy cover with the mounting bracket by bringing the canopy cover into contact with the mounting bracket with their engaging elements having predetermined initial mutual disposition, and turning the canopy in a mounting direction about the axis X until these elements take a final mutual disposition, in which movement of the canopy cover in a direction opposite to the mounting direction with respect to the mounting bracket is releasably restricted.

In the present example, the bracket engaging elements of the mounting bracket 20 are in the form of outwardly extending protrusions 25 of the side wall 28 of the base 20a of the mounting bracket, spaced along its circumference by gaps 23 and each having a bracket engaging surface 27 oriented transversely to the axis X' of the mounting bracket.

In FIG. 2A, the bracket engaging surfaces are shown as being oriented generally perpendicularly to the axis X' of the mounting bracket.

Figure 3A:
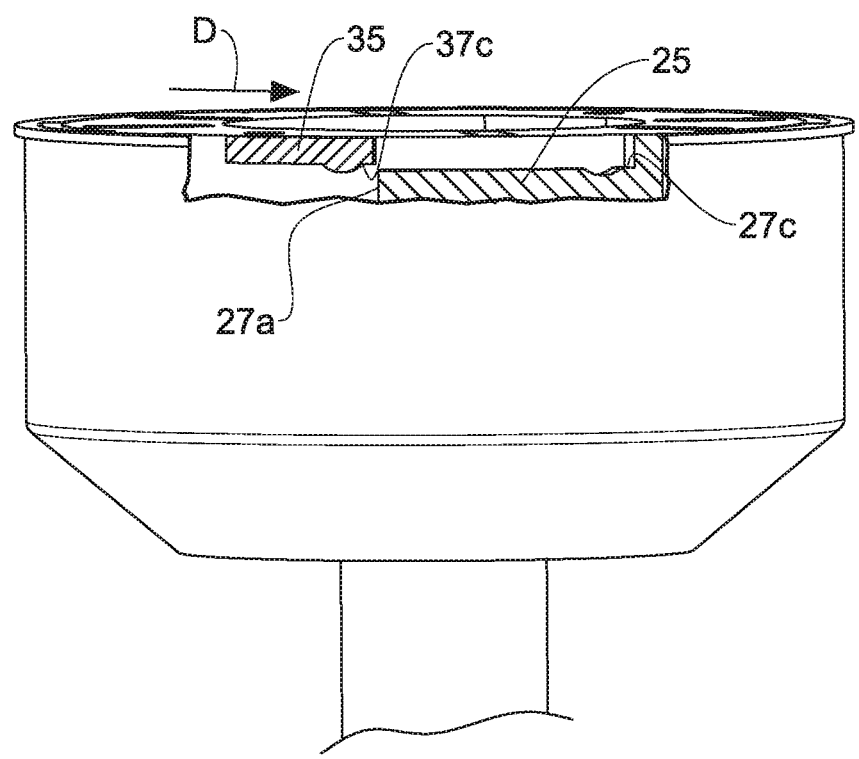
FIG. 3A is a partially-sectioned side view of the mounting apparatus shown in FIGS. 2A and 2B, shown in the process of being assembled.

The canopy cover 30 comprises corresponding cover engaging elements 35, which are in the form of protrusions in the cover circumferential wall 32 extending into the cavity upper portion 34', each configured to fit within the gap 23 between two adjacent bracket engaging elements 25. Each cover engaging element 35 comprises a cover engaging surface 37 configured to slide along the respective bracket engaging surface 27 of the mounting bracket when they are brought into contact with each other by the canopy cover being turned in a mounting direction D (FIG. 3A) relative to the mounting bracket.

In the present example, the bracket engaging surface 27 of each bracket engaging element 25 comprises a leading portion 27a, a trailing portion 27c and an intermediate portion 27b extending therebetween, whilst the cover engaging surface 37 of each cover engaging element 35 comprises a corresponding leading portion 37c, trailing portion 37a and an intermediate portion 37b therebetween. The leading and trailing portions of the engaging surfaces are defined herein with respect to the mounting direction D.

The canopy cover and the mounting bracket can be formed with mating arresting elements, which when brought into a mating contact with each other during the turning movement of the canopy cover, engage each other so as to restrict its movement in the mounting direction as well as in the direction opposite to the mounting direction.

The configuration of the arresting elements can be such that, once they are brought into the engaging contact, any turning movement of the canopy cover relative to mounting bracket can be allowed only upon intentional disengagement between the arresting elements. The arresting elements can be integrated in any part of the apparatus where there is contact between the canopy cover and the mounting bracket. In the structure shown in FIGS. 2A to 3B, the arresting elements are in the form of a depression 27c' in the trailing portion 27c of the bracket engaging surface 27 and a corresponding projection 37c' in the leading portion 37c of the canopy cover engaging surface 37 configured to be received within the depression 27c' once the canopy cover engaging surface leading portion 37c fully covers the mounting bracket engaging surface trailing portion 27c and the upper open end 36 of the canopy cover is aligned with or at least disposed very close to the uppermost surface 24 of the mounting bracket.

Figure 3B:
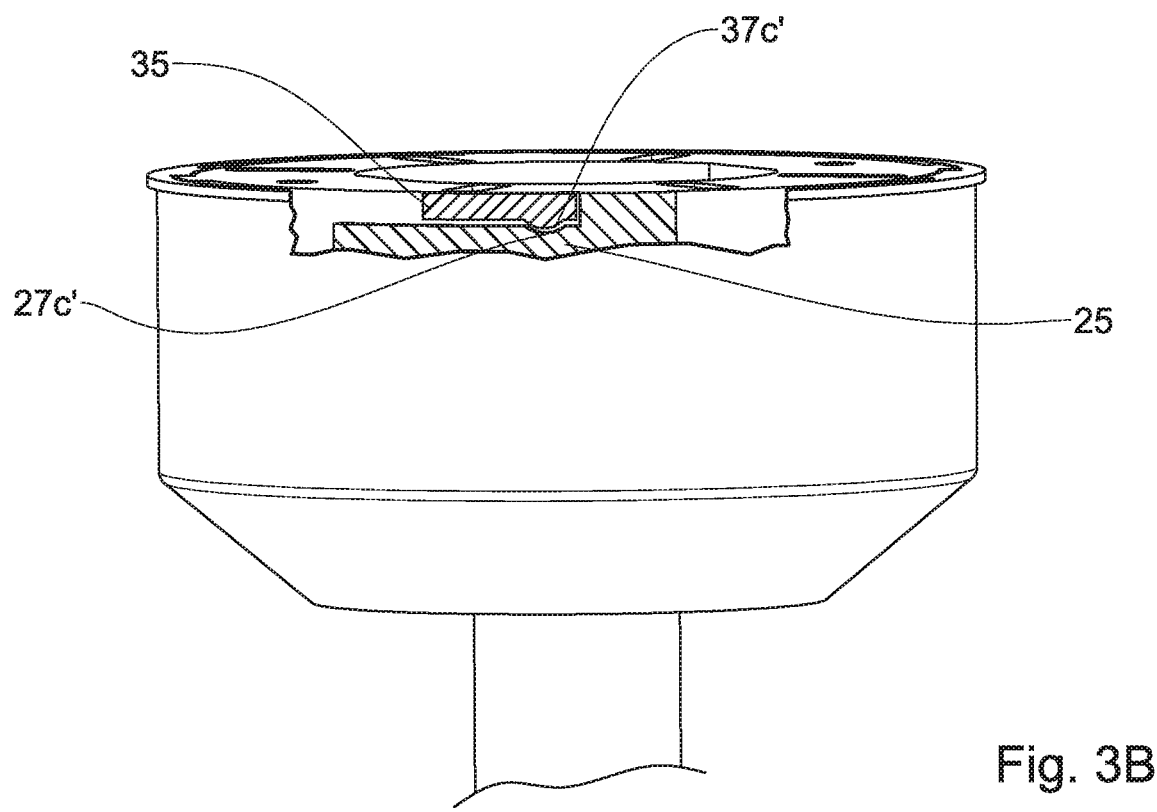
FIG. 3B is a partially-sectioned side view of the mounting apparatus shown in FIGS. 2A and 2B, when assembled.

Once the mounting bracket with the downrod 81 extending downwardly therefrom, has been fixed to the ceiling 90, the canopy cover 30 is mounted to the mounting bracket 20 by the following steps:

lifting the canopy cover 30 into a position that its circumferential wall 32 surrounds the side wall 28 of the mounting bracket, with the mounting collar 21 of the mounting bracket being received within the cavity 34 of the canopy cover, the downrod extending downwardly from the lower open end 38 of the canopy cover 30, and the protrusions 35 of the canopy cover 30 being received within the gaps 23 of the mounting bracket so that at least the trailing portions 37a of the cover engaging surfaces 37 are disposed higher than the leading portions 27a of their respective bracket engaging surfaces 27, as seen in FIG. 3B and FIG. 3C; and turning the canopy cover 30 about the axis X in the mounting direction D so as to causes the cover engaging surfaces 37 to slide along the bracket engaging surfaces 27 until the projection 37c' of the leading portion 37c of the canopy cover engaging surface 37 enters the depression 27c' in the trailing portion 27c of the mounting bracket engaging surface 27, whereby any further movement of the canopy cover with respect to the mounting bracket about axis X prevented.

Thus, the mounting bracket engaging surfaces function as surfaces upon which the canopy cover engaging surfaces rest when the canopy cover 30 is hanging thereon under the influence of gravity.

To provide the assembly with necessary stability, the number of the bracket engaging surfaces and corresponding cover engaging surfaces should be at least two.

In the structure shown in the Figs herein, this number is four.

The size of the mating engaging elements 25, 35, and their positioning on their corresponding walls 28, 32 can vary. Specifically, the engaging elements 25 and 35 can differ in sizes and design to create a unique pattern, which restricts the allowable orientation, in which the canopy cover can engage the mounting bracket during mounting thereto.

The above is correct also regarding dimensions related to the distance of the engaging surfaces 27 and 37 from the ceiling 90, when the apparatus 10 is mounted thereon.

This distance determines the height of the canopy cover upper open end 36 with respect to the uppermost bracket surface 24, when the apparatus is assembled and mounted to the ceiling. The mounting apparatus can further comprise stopping means for preventing the movement of the canopy cover in the mounting direction when the canopy cover has reached its desired position relative to the mounting bracket. In the present example, this position is the one, in which the arresting elements 27c and 37c engage each other, and the stopping means are in the form of a bracket stopping step 25a disposed in front of that surface in the mounting direction D, and a cover abutment surface 35a constituting a leading end of the cover engaging element 35, both being oriented perpendicularly to their associated bracket and cover engaging surfaces. The stopping step 25a is thus configured for being abutted by the cover abutment surface 35a so as to prevent forced movement of the canopy cover relative to the mounting bracket after their arresting elements have been brought into engaging contact therebetween.

In order to detach the canopy cover from the mounting bracket, the canopy cover 30 should be lifted so that the projection 27c' will leave the depression 37c', and then turned about the axis X in the direction opposite to the mounting direction D until the protrusions 27c' reach the gaps 23 allowing lowering and taking the canopy cover away from the mounting bracket.

The engaging elements of the mounting bracket and the canopy cover and/or their arresting elements can have any desired geometry provided they fulfill function identical or at least similar to those described above. This geometry can include specifically designed engaging surfaces, which can have an orientation other than being perpendicular to the central axis X, can have a shape other than planar, and can be patterned rather than being smooth. For example, engaging surfaces can be inclined relative to the axis X so that upon turning the canopy cover in the mounting direction, sliding of the engaging surfaces of the canopy cover along those of the mounting bracket results in the canopy cover moving upwardly. In this case, the apparatus can be so designed that this movement will be allowed until the upper open end 36 of the canopy cover abuts the support surface, to which the apparatus is mounted. In this case, the latter surface and the upper open end of the canopy cover constituting stopping means of the apparatus.

Some specific examples of different options listed in the previous paragraph are presented below with reference to FIGS. 4A and 4B.

Figure 4A:
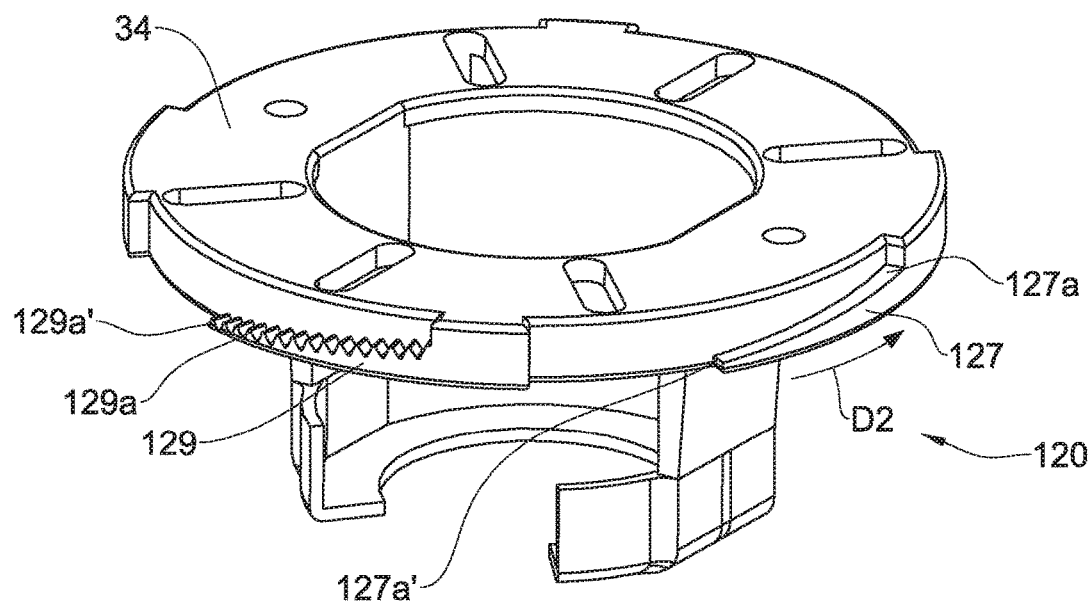
FIG. 4A is a perspective view of a mounting bracket of a mounting apparatus according to a second example of the presently disclosed subject matter.
Figure 4B:
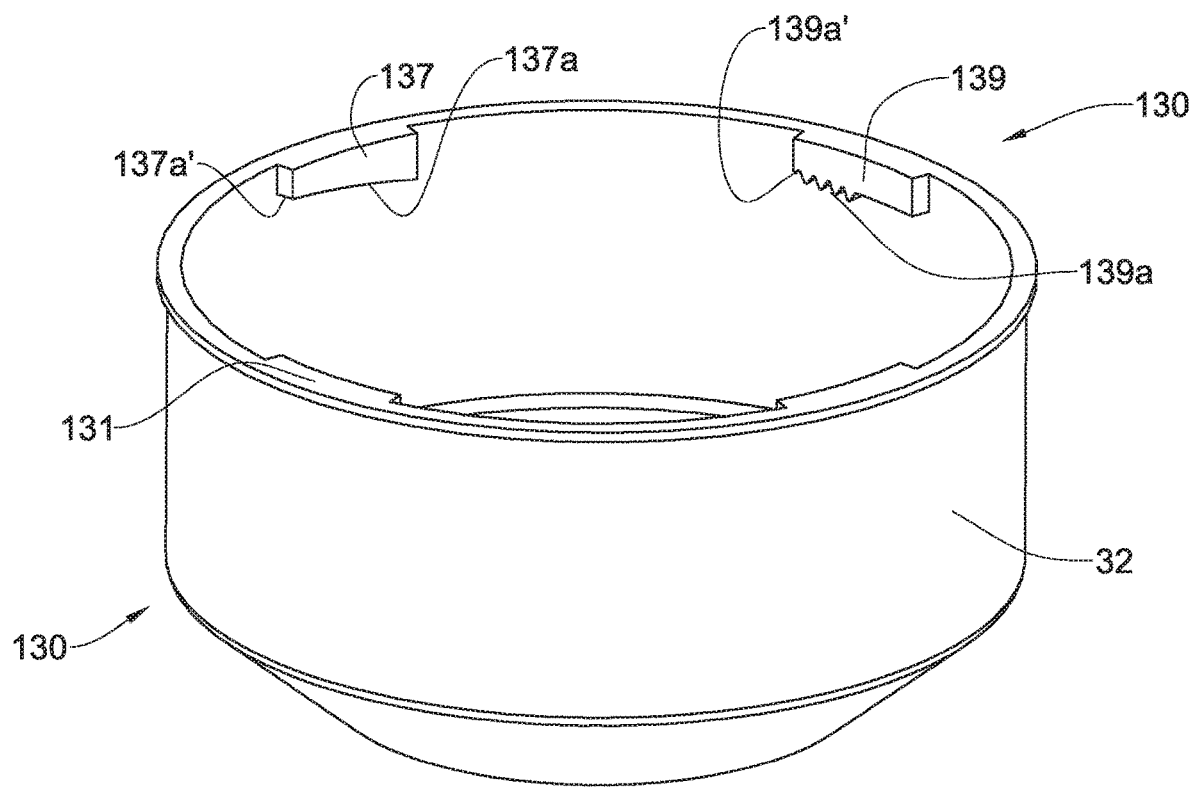
FIG. 4B is a perspective view of a canopy cover of the mounting apparatus whose mounting bracket is shown in FIG. 4A.
Figure 5A:
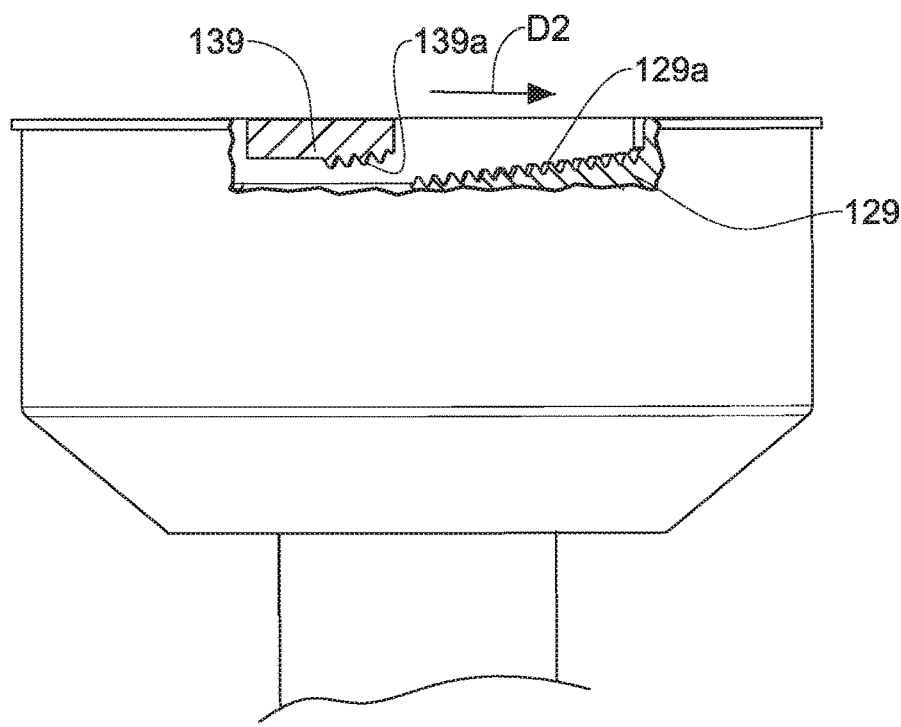
FIG. 5A is a partially-sectioned side view of the mounting apparatus shown in FIGS. 4A and 4B, shown in a process of being assembled.
Figure 5B:
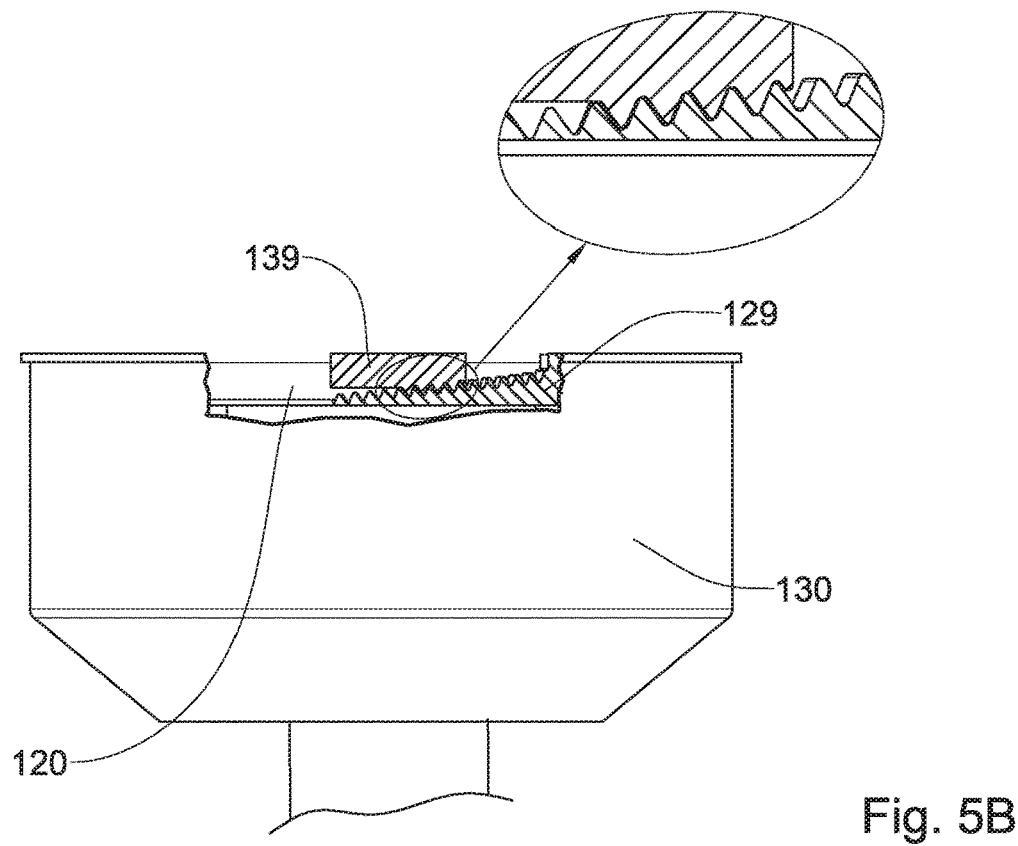
FIG. 5B is a partially-sectioned side view of the mounting apparatus shown in FIGS. 4A and 4B, when assembled.

FIGS. 4A and 4B illustrate a mounting apparatus 100 comprising a mounting bracket 120 and a canopy cover 130, which are identical to the mounting bracket 20 and the canopy cover 30, respectively, except for the design of their engaging elements.

Accordingly, elements of the mounting bracket 120 and the canopy cover 130 other than those relating to the engaging elements are designated in these drawings by the same reference numerals as the corresponding elements of the mounting bracket 20 and the canopy cover 30.

In this example, the engaging elements of the mounting bracket 120 and the canopy cover 130 have engaging surfaces that are inclined at identical angles relative to the axis X so that upon turning the canopy cover in the mounting direction, sliding of the engaging surfaces of the canopy cover along those of the mounting bracket results in the canopy cover moving upwardly in a helical manner.

From the point of view of the shape of the engaging surfaces of the engaging elements in this example, they are either smooth as in the engaging elements 127 and 137 of the mounting bracket 120 and canopy cover 130, respectively, or serrated, as in the engaging elements 129 and 139 of the mounting bracket 120 and canopy cover 130, respectively.

Due to the mating serrated shape of the engaging surfaces 129a and 139a, their serrations constitute a plurality of projections and depressions, which function as arresting elements restricting the capability of turning movement of the canopy cover 130 relative to the mounting bracket 120 in the direction opposition the mounting direction D2.

Mounting the canopy cover 130 to the mounting bracket 120 after the latter has been fixed to the ceiling is similar to mounting the canopy cover 30 to the mounting bracket 20, with the differences being associated with the inclination of the engaging surfaces due to which, when the canopy cover 130 is turned about the axis X in the direction D, it moves upwards until its upper open end 36 contacts the ceiling, being thus flush with the uppermost bracket surface 134.

In some examples, the upper open end 36 of the canopy cover 130 can contact the ceiling 90 beyond the height of the uppermost bracket surface 34, for example when the latter is hung distally from the ceiling or when the ceiling has a certain form which allows it.

In other examples the material, from which the canopy cover 30 is made, can be rigid enough to slightly penetrate the surface of the ceiling beyond the height of the mounting bracket uppermost surface 34, by moving the canopy cover upwards and turning in the mounting direction D2. Alternatively, the material of the canopy cover 30 can flexible enough suit itself to the surface of the ceiling.

In order to release the restriction created by the mating serrated shape of the engaging surfaces 129a and 139a, it is necessary to strongly turn the canopy cover 130 with respect to the mounting bracket 120 so as to snap release the serrated surfaces 129a and 139a from each other.

In this example, the mounting apparatus 100 has two kinds of bracket and cover engaging elements, this does not need to be the case, and all the elements can be of the same kind, and can all have or not have the arresting serrations described above. Moreover, instead of or in addition to the serrations, further arresting mechanism can be used for restricting the capability of the canopy cover to move in the direction opposite to the mounting direction D2.

In both the above examples, the structure of the mounting mechanism is configured to allow mounting the canopy cover to the mounting bracket in a single continuous operation that can be performed by a user without any external tools and using only one hand.

In addition to the arresting elements used in the apparatus 10,100 according to the presently disclosed subject matter, the apparatus 10,100 can comprise a locking arrangement configured to snap-lock the canopy cover to the mounting bracket during the process of being mounted thereto. Such locking can still be a part of the single continuous mounting operation, which as mentioned above can be performed by a user without any external tool and using only one hand. However, in order to make sure that no unintentional detachment of the canopy cover from the mounting bracket is performed, the locking arrangement can be further configured for requiring an external tool for releasing the locking.

Figure 6A:
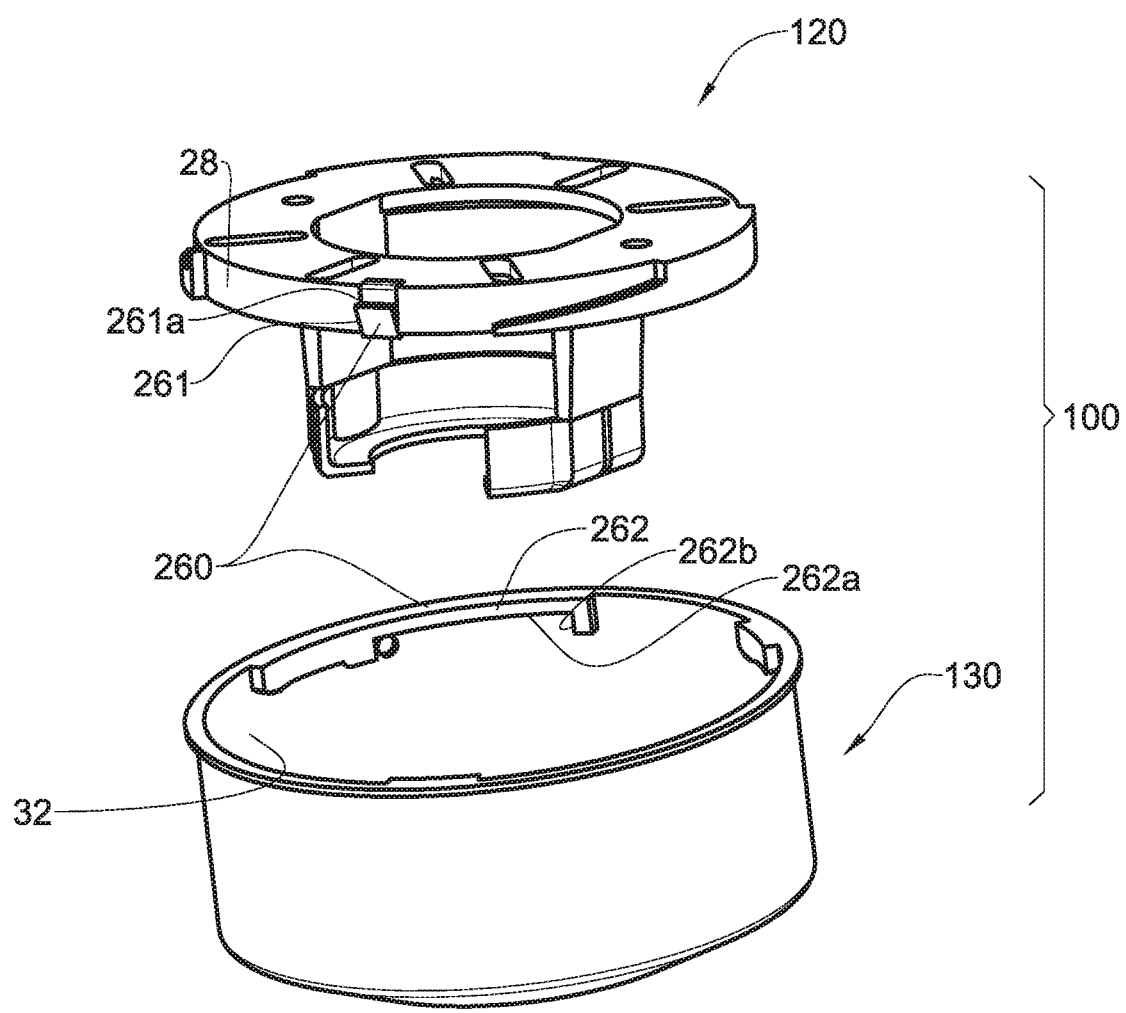
FIG. 6A is a perspective view of a mounting apparatus according to a further example of the presently disclosed subject matter, in a non-assembled state.
Figure 6B:
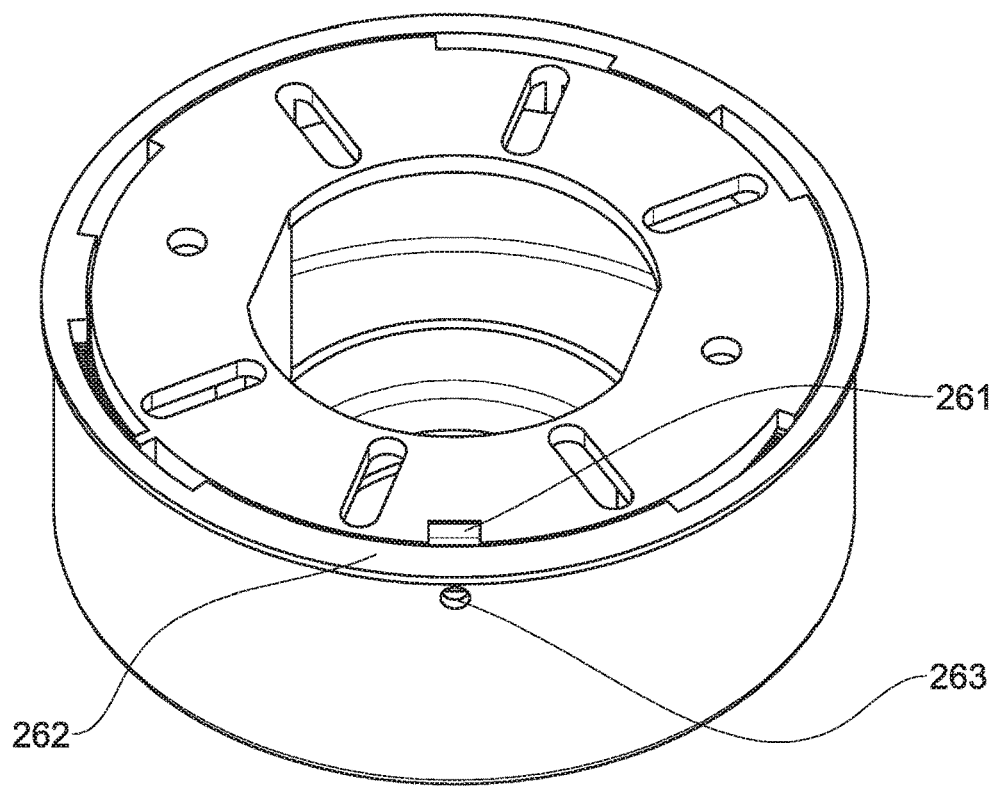
FIG. 6B is a perspective view of the mounting apparatus shown in FIG. 6A, in the process of being assembled.
Figure 6C:
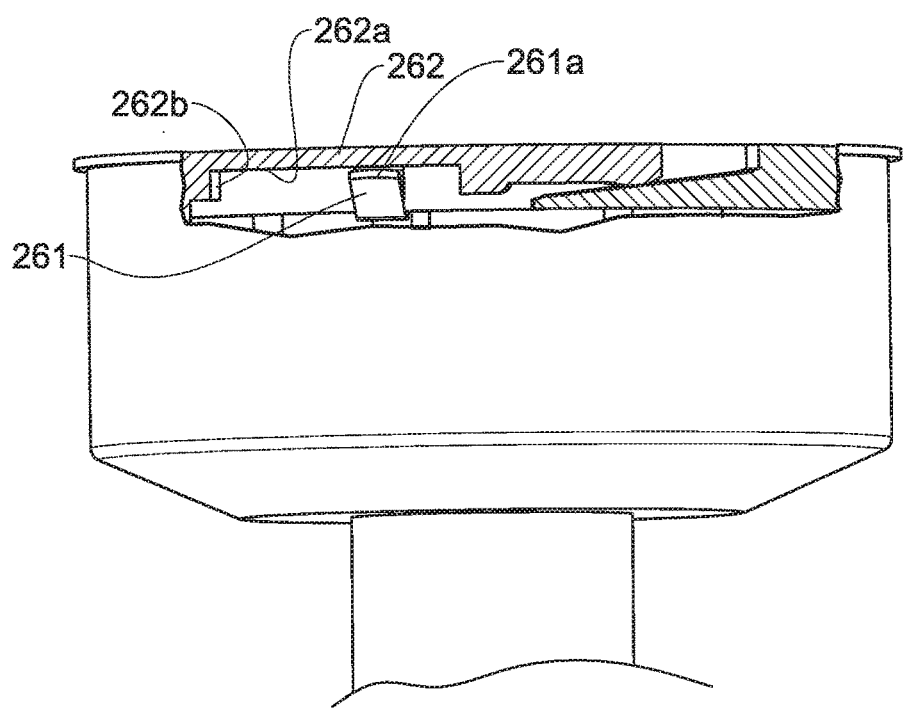
FIG. 6C is a perspective view of the mounting apparatus shown in FIG. 6A, when assembled.

FIG. 6A to FIG. 6C illustrate one example of such locking arrangement 260 when integrated in the apparatus 100. The locking arrangement 260 comprises a springy element 261 having an uppermost edge 261*a*, held by the mounting bracket 120 within a gap 23 between two adjacent mounting bracket engaging elements 125, and a compressing bar 262 having a compressing bar edge 262*a* and a shoulder 262*b*.

The compressing bar 262 is associated with one of the cover engaging elements 135 of the canopy cover 130 so that during the movement of the canopy cover 130 in the mounting direction D2, the element 261 is compressed against the side wall 28 of the mounting bracket 120, initially by the engaging element 135 and afterwards by the compressing bar 262, until the compressing bar edge 262*a* passes the height of the uppermost edge 261*a* of the element 261, and when this happens, the compression is released and the springy element 261 snaps towards the circumferential wall 32, beneath the compressing bar 262.

In this state, the canopy cover 130 is prevented from detaching from the mounting bracket 120, by virtue of the springy element 261 locking it by the compressing bar 262, so that the canopy cover 130 can be turned in a direction opposite to the mounting direction D2 only until the springy element 261 abuts the engaging element 135. On the other hand, further movement of the canopy cover 130 in the mounting direction is still allowed in this state until the shoulder 262*b* of the compressing bar abuts the springy element 261 or until the upper open end 36 of the canopy cover 130 abuts the ceiling 90.

In order to allow releasing of the locking, the canopy cover has an access port 263 formed in the circumferential wall 32 thereof at a height corresponding to that of the element 261. The access port 263 is positioned adjacent to the engaging element 135 such that it faces the springy member 261 when the latter abuts the engaging element 135.

When the canopy cover 130 is mounted to the mounting bracket 120 a user has to initially turn the canopy cover 130 to a position where the access port 263 faces the springy flange 261, and then to insert a tool, e.g. a screwdriver onto the access port 263, and compress the springy flange 261 away from the circumferential wall 32 until it is no longer positioned beneath the compressing bar 262, simultaneously, the user has to lower the canopy cover 130 so that the compressing bar 262 could return to compress the springy element 261, or alternatively to turn the canopy cover 130 so that the engaging element 135 could return to compress the springy element 261. It is appreciated that In order to do that successfully, the user have to use both of his hands.

This necessary use of tools for detaching the canopy cover, which may contain electrical components, from the mounting bracket, complies with the demands of the US safety standard.

All the above described mounting mechanisms are applicable not only to ceiling fans that are used with downrods in order to be mounted at an essential distance from their support surface, but also to ceiling fans mounted without any downrod, e.g. such as flush mounted ceiling fans, that can be connected directly to a canopy cover similar to that described above by any means known in the art, and be hanging therefrom as the canopy cover is mounted to the mounting bracket.

The canopy cover 30, 130 of the mounting apparatus 10, 100, can have any design allowing its mounting as described above, and can further have additional features not necessarily connected with its manner of mounting.

Figure 7:
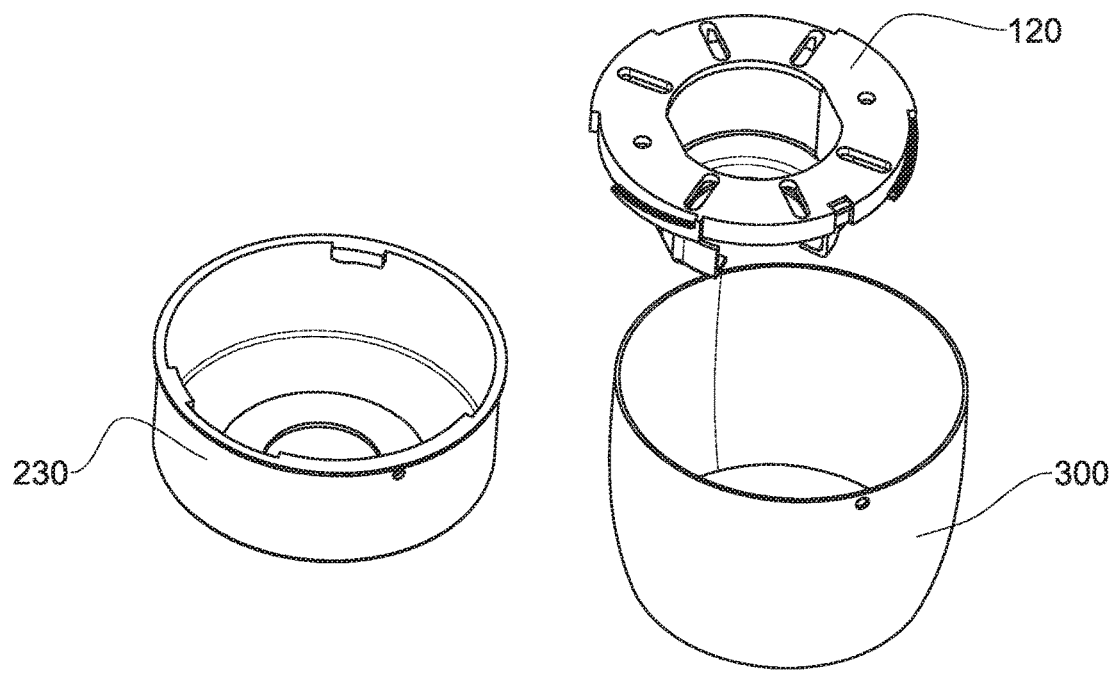
FIG. 7 is a perspective view of the mounting apparatus shown in FIG. 6A, together with a skirt member.
Figure 8:
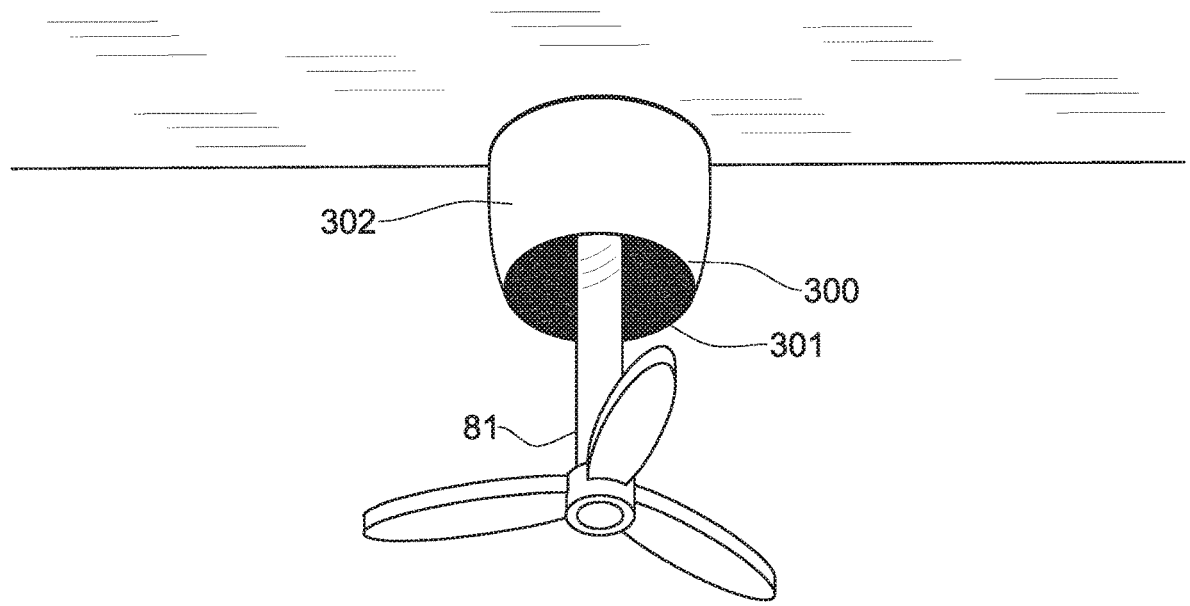
FIG. 8 is a perspective view of a ceiling fan with a mounting apparatus according to a still further example of the presently disclosed subject matter.

Such additional features can be as illustrated in FIG. 7, where the canopy cover 130 is shown together with a skirt member 300. configured to be attached to the circumferential wall 132 of the canopy cover so as to conceal the protrusion area of the downrod 81 from the canopy cover lower open end 13 when the apparatus is assembled and mounted to the ceiling as in FIG. 8.

In order to achieve this concealing affectively, the extension herein is determined to be 0.4 times longer than the shortest distance between the aforementioned protrusion area and the uppermost surface 24 of the mounting bracket.

As seen in FIG. 8, when the skirt 300 is attached to the canopy cover 130, whilst the apparatus 10 is mounted to the ceiling, it extends significantly below the canopy cover 130 such that the area of protrusion of the downrod 81 from the canopy lower open end 38 is concealed from an observer standing below the ceiling fan 80 and away from the longitudinal axis X.

It is further appreciated that the surfaces 301 of the skirt 300 which faces inwardly, as well as the surfaces of the canopy cover 230 which faces downwardly [not seen] when the apparatus is assembled, can be colored in dark colors, as schematically shown in FIG. 8, to create a shading effect on the downrod 81.

The opposite surfaces 302 of the skirt 300, which face outwardly, can be colored in light colors, as shown in FIG. 8, to enhance this effect.

With such coloring, the protrusion area as described will be concealed from the sight of an observer, and the upper part of the downrod 81 will appear to be shaded and somewhat blur when surrounded by the skirt 300.

It is further appreciated that the light colored surfaces aforementioned can be colored at any color corresponding with the downrod to yet further enhance the shading effect, or match the color of the downrod.

When the lower open end 38 of the canopy cover 30,130 is large enough such that the mounting bracket 20,120 is visible from below, the mounting bracket can also be colored similarly to the inner surface 131, or alternatively, the skirt 300 can even extended longer to conceal the protrusion area affectively.

In other embodiments of the presently disclosed subject matter, the skirt 300 can be integral with the canopy cover.

The invention claimed is:

1. An apparatus for mounting a ceiling fan to a support surface such as a ceiling, the apparatus having a central axis oriented perpendicularly to the support surface when the apparatus is mounted thereto, the apparatus comprising:

a mounting bracket configured to support said ceiling fan when hanging therefrom and having a first bracket surface configured to contact the support surface, a second bracket surface opposed to said first bracket surface and spaced therefrom along the central axis, and a side wall extending between the first and second bracket surfaces;

at least one bracket engaging surface constituting a part of the side wall of the bracket and oriented transversely to the central axis of the apparatus;

a canopy cover configured to be detachably mounted to the mounting bracket, the canopy cover having a cover circumferential wall defining a cavity having an upper portion associated with a canopy upper open end, the canopy cover being configured to receive at the canopy upper open end the mounting bracket and enclose it within the cavity upper portion so that, when the canopy cover is mounted to the mounting bracket and the ceiling fan is hung therefrom, the ceiling fan is disposed below the canopy cover;

at least one cover engaging surface protruding from the cover circumferential wall into the cavity and configured to move along the bracket engaging surface in a mounting direction defined by an imaginary line lying in a plane transverse to the central axis and being at least partially inclined towards the first bracket surface, when during mounting, the canopy cover is moved relative to the mounting bracket in said mounting direction at least up to a point where said upper open end of the canopy cover is at the same height as said first bracket surface; and an arresting mechanism operable as a result of the canopy cover having been moved relative to the mounting bracket in said mounting direction to a required extent and configured to releasably restrict movement of the cover engaging surface relative to the bracket engaging surface in a direction opposite to the mounting direction.

2. The apparatus according to claim 1, wherein said arresting mechanism comprises at least one canopy cover arresting element constituting a part of the canopy cover, and at least one corresponding mounting bracket arresting element constituting a part of the mounting bracket, the arresting elements of the canopy cover and the mounting bracket being configured to engage each other so to releasably restrict movement of the cover engaging surface relative to the bracket engaging surface in a direction opposite to the mounting direction, the engagement being configured to take place as a result of the canopy cover having been moved relative to the mounting bracket in said mounting direction to a required extent.

3. The apparatus according to claim 2, wherein each canopy cover arresting element and the corresponding mounting bracket arresting element forming a pair of arresting elements, and wherein one of the pair of arresting elements is in the form of a protrusion and the other one of these elements is in the form of a mating depression configured to at least partially receive said protrusion therein.

4. The apparatus according to claim 1, wherein said cover engaging surface is configured to move slidingly along at least a portion of the bracket engaging surface during the mounting.

5. The apparatus according to claim 1, wherein at least a part of the imaginary line defining the mounting direction is helical about the central axis, such that a tangent line to this helical part forms an oblique angle with said central axis.

6. The apparatus according to claim 1, wherein said cavity further comprises a lower portion associated with a canopy lower open end, which is opposite to the canopy upper open end.

7. The apparatus according to claim 6, wherein said canopy upper open end and said canopy lower open end are aligned along said central axis.

8. The apparatus according to claim 6, wherein said canopy is configured to have its lower open end spaced from said second bracket surface, when the canopy is mounted to the mounting bracket, to a distance at least 50% greater than the shortest distance between said first bracket surface and the second bracket surface.

9. The apparatus according to claim 6, wherein any surface of the bracket and the canopy, which faces towards the lower portion of said cavity and is seen through the canopy lower open end, is colored in a dark color.

10. The apparatus according to claim 9, wherein a surface of the circumferential wall that faces towards an exterior of the apparatus, is colored in a color lighter than said dark color.

11. An apparatus for mounting a ceiling fan to a support surface such as a ceiling, the apparatus having a central axis oriented perpendicularly to the support surface when the apparatus is mounted thereto, the apparatus comprising:

a mounting bracket configured to support said ceiling fan when hanging therefrom and having a first bracket surface configured to contact the support surface, a second bracket surface opposed to said first bracket surface and spaced therefrom along the central axis, and a side wall extending between the first and second bracket surfaces;

at least one bracket engaging surface constituting a part of the side wall of the bracket and oriented transversely to the central axis of the apparatus;

a canopy cover configured to be detachably mounted to the mounting bracket, the canopy cover having a cover circumferential wall defining a cavity having an upper portion associated with a canopy upper open end, the canopy cover being configured to receive at the canopy upper open end the mounting bracket and enclose it within the cavity upper portion so that, when the canopy cover is mounted to the mounting bracket and the ceiling fan is hung therefrom, the ceiling fan is disposed below the canopy cover;

at least one cover engaging surface protruding from the cover circumferential wall into the cavity and configured to move along the bracket engaging surface in a mounting direction defined by an imaginary line at least partially lying in a plane transverse to the central axis, when during mounting, the canopy cover is moved relative to the mounting bracket in said mounting direction; at least a portion of at least one of said engaging surfaces being serrated; and an arresting mechanism operable as a result of the canopy cover having been moved relative to the mounting bracket in said mounting direction to a required extent and configured to releasably restrict movement of the cover engaging surface relative to the bracket engaging surface in a direction opposite to the mounting direction.

12. The apparatus according to claim 11, wherein said at least one cover engaging surface and said at least one bracket engaging surface constitute a plurality of cover engaging surfaces and bracket engaging surfaces, respectively, disposed oppositely to one another, and spaced from each other along the circumferential wall of the canopy cover and the sidewall of the mounting bracket, respectively.

13. The apparatus according to claim 11, wherein said cavity further comprises a lower portion associated with a canopy lower open end, which is opposite to the canopy upper open end.

14. The apparatus according to claim 13, wherein said canopy upper open end and said canopy lower open end are aligned along said central axis.

15. The apparatus according to claim 13, wherein said canopy is configured to have its lower open end spaced from said second bracket surface, when the canopy is mounted to the mounting bracket, to a distance at least 50% greater than the shortest distance between said first bracket surface and the second bracket surface.

16. The apparatus according to claim 13, wherein any surface of the bracket and the canopy, which faces towards the lower portion of said cavity and is seen through the canopy lower open end, is colored in a dark color.

17. The apparatus according to claim 16, wherein a surface of the circumferential wall that faces towards an exterior of the apparatus, is colored in a color lighter than said dark color.

18. The apparatus according to claim 11, wherein said apparatus further comprises a locking arrangement configured, at least when the canopy cover is mounted to the mounting bracket, to selectively restrict the canopy cover from being detached from the mounting bracket.

19. The apparatus according to claim 18, wherein said locking arrangement is a snap-locking arrangement, concealed within the apparatus when assembled and comprising an elastic member and a compressing member configured to compress the elastic member as the canopy cover is being mounted to the mounting bracket, and snap-release the compression at a pre-determined disposition between the elastic member and the compressing member so as to lock the compressing member and the elastic member together.

20. The apparatus according to claim 19, wherein said canopy cover further comprises an access path configured to provide a restricted access to the elastic member from an exterior of the apparatus, and wherein said access path is such that only a designated tool can be inserted therein to release the compression of the elastic member.

* * * * *